United States Patent [19]

Oury et al.

[11] Patent Number: 5,762,179
[45] Date of Patent: Jun. 9, 1998

[54] CONVEYOR MODULAR CONSTRUCTION TECHNIQUES

[75] Inventors: Robert F. Oury, Gilberts; Mark S. Dingeldein, Lombard; Alan S. Ledger, Addison; James C. Graham, Arlington Heights, all of Ill.

[73] Assignee: Rotec Industries, Inc., Elmhurst, Ill.

[21] Appl. No.: 631,937

[22] Filed: Apr. 15, 1996

[51] Int. Cl.$^6$ .................................................. B65G 21/06
[52] U.S. Cl. .................. 198/861.1; 198/594; 198/830; 198/860.2
[58] Field of Search .................. 198/588, 594, 198/830, 860.2, 861.1

[56] References Cited

U.S. PATENT DOCUMENTS 3,656,607  4/1972  Gorgei et al. ................ 198/588 X
3,863,783  2/1975  Spellman, Jr. ................. 198/588 X
4,846,580  7/1989  Oury .................................. 366/27

FOREIGN PATENT DOCUMENTS 737295  6/1966  Canada ............................. 198/588
1318026  5/1973  United Kingdom ........... 198/588

Primary Examiner—Janice L. Krizek
Attorney, Agent, or Firm—McAndrews, Held & Malloy, Ltd.

[57] ABSTRACT

A chord member for facilitating the assembly and disassembly of a concrete conveyor system including a top flange defining a first plane, a pair of depending lips positioned at either end of the top flange, a bottom flange defining a second plane parallel to the first plane and a middle flange defining a third plane perpendicular to the first plane. A clevis is coupled to the top flange or the bottom flange so that a truss of the conveyor system can be attached to the clevis.

25 Claims, 11 Drawing Sheets

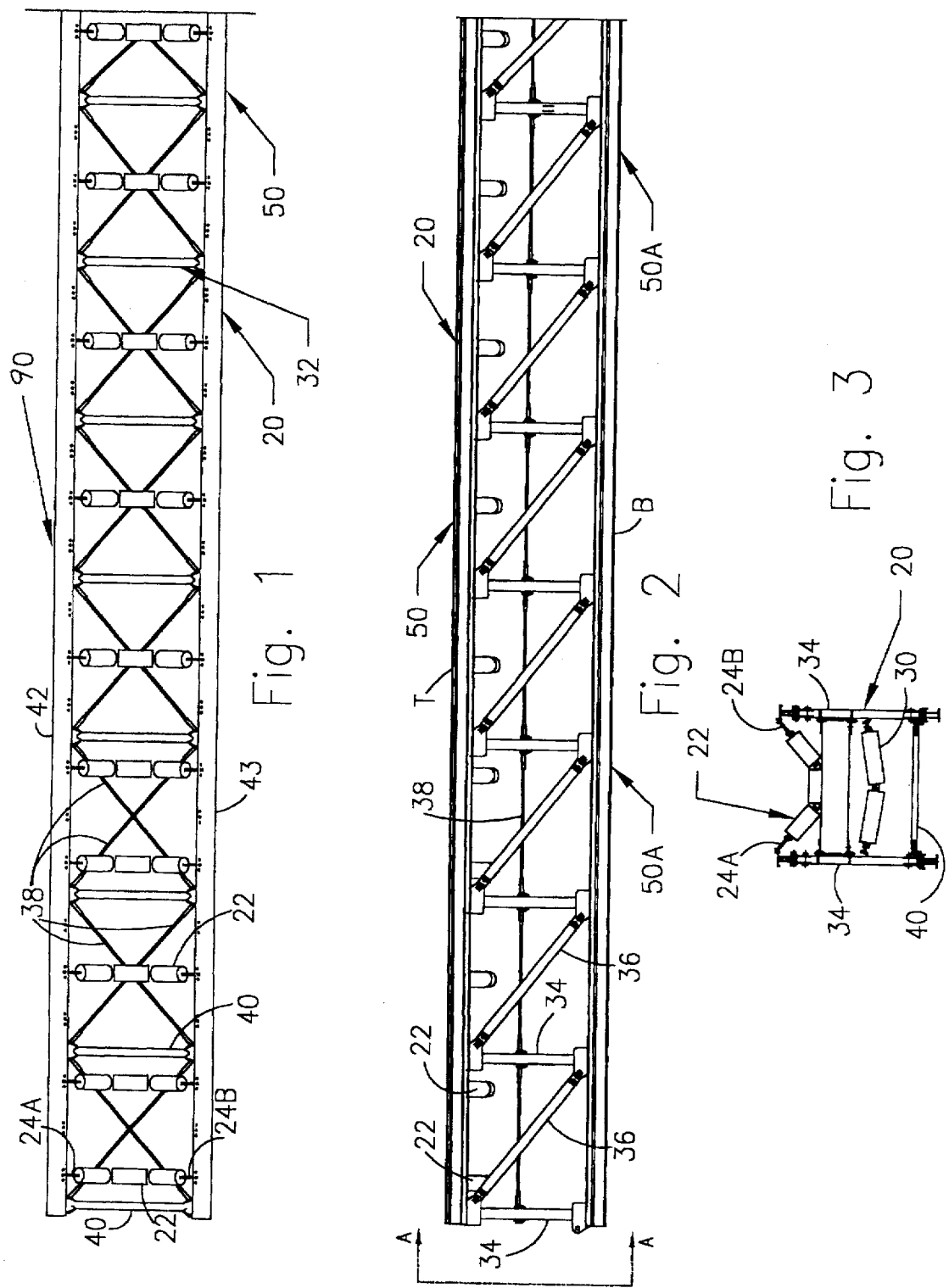

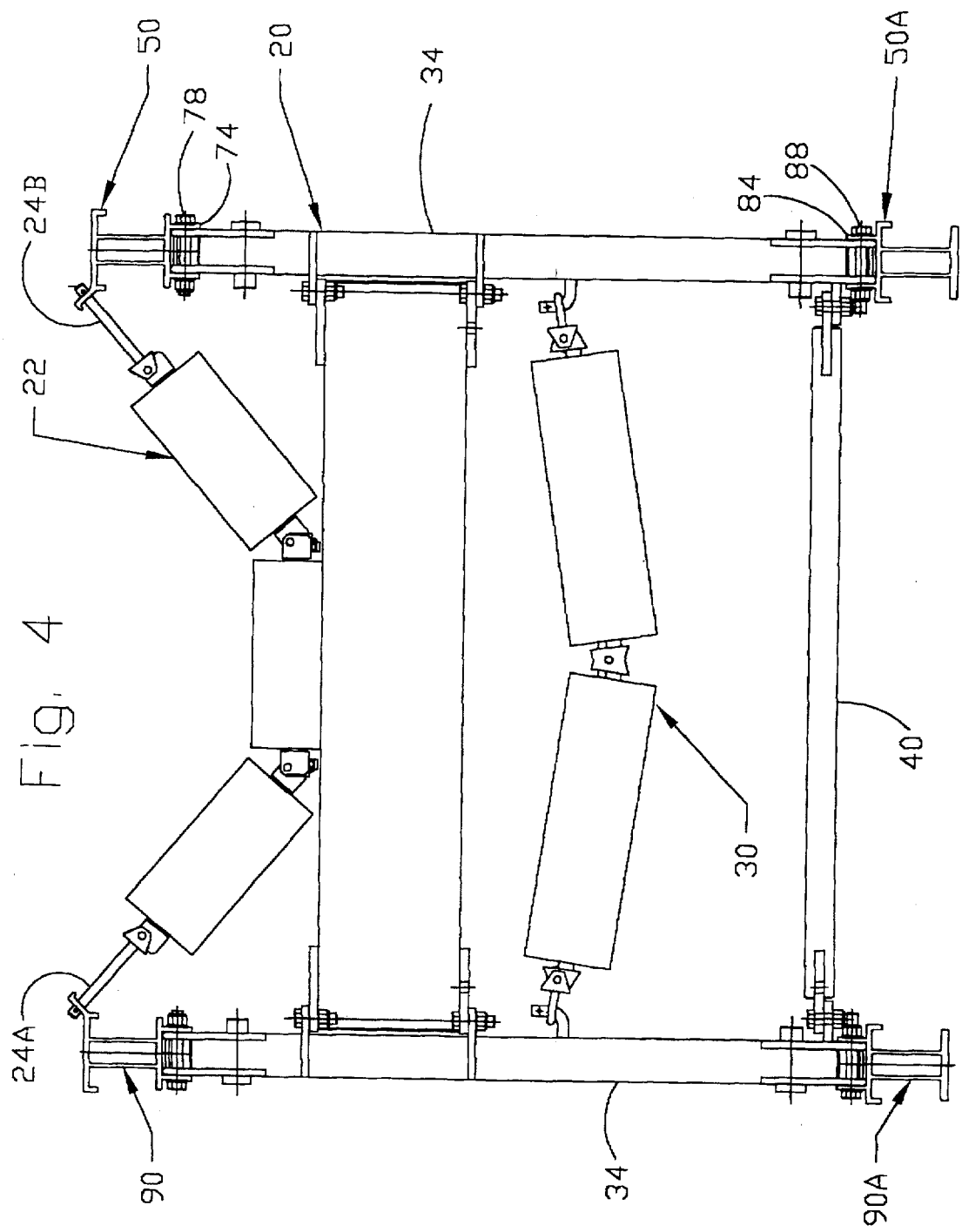

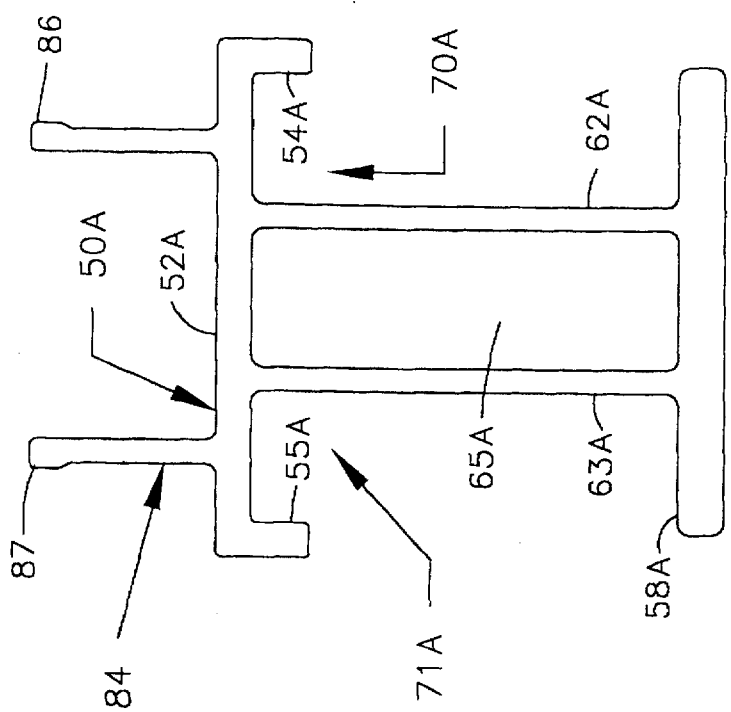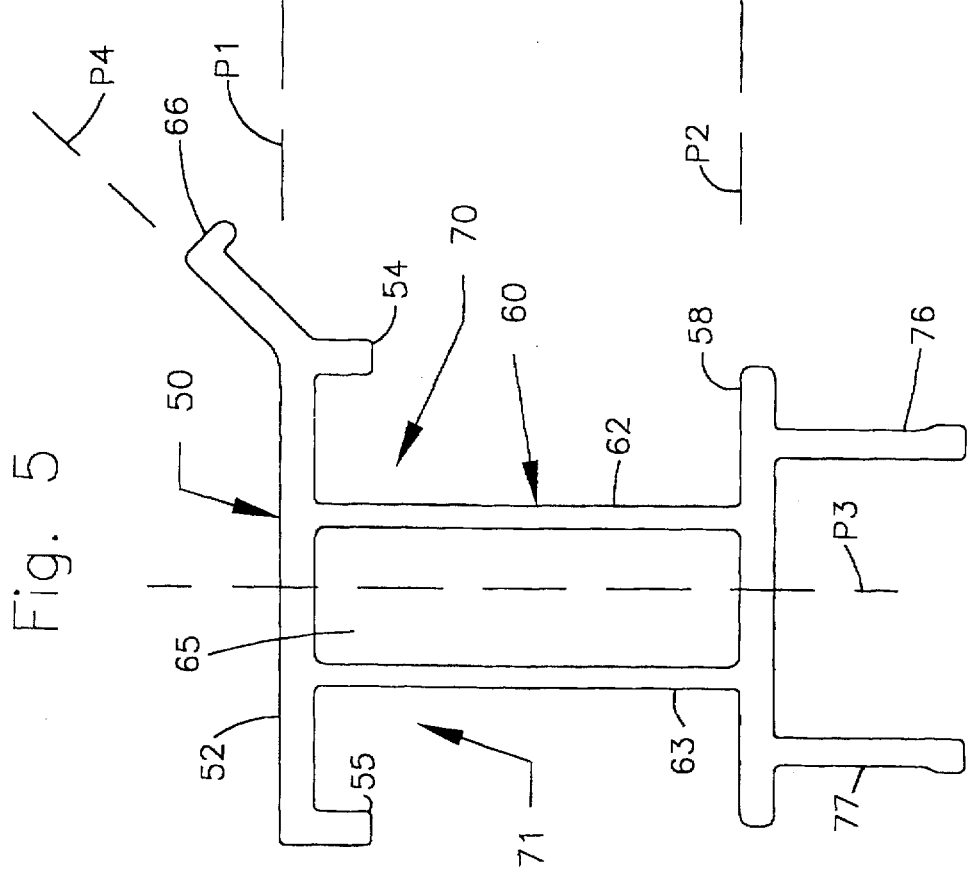

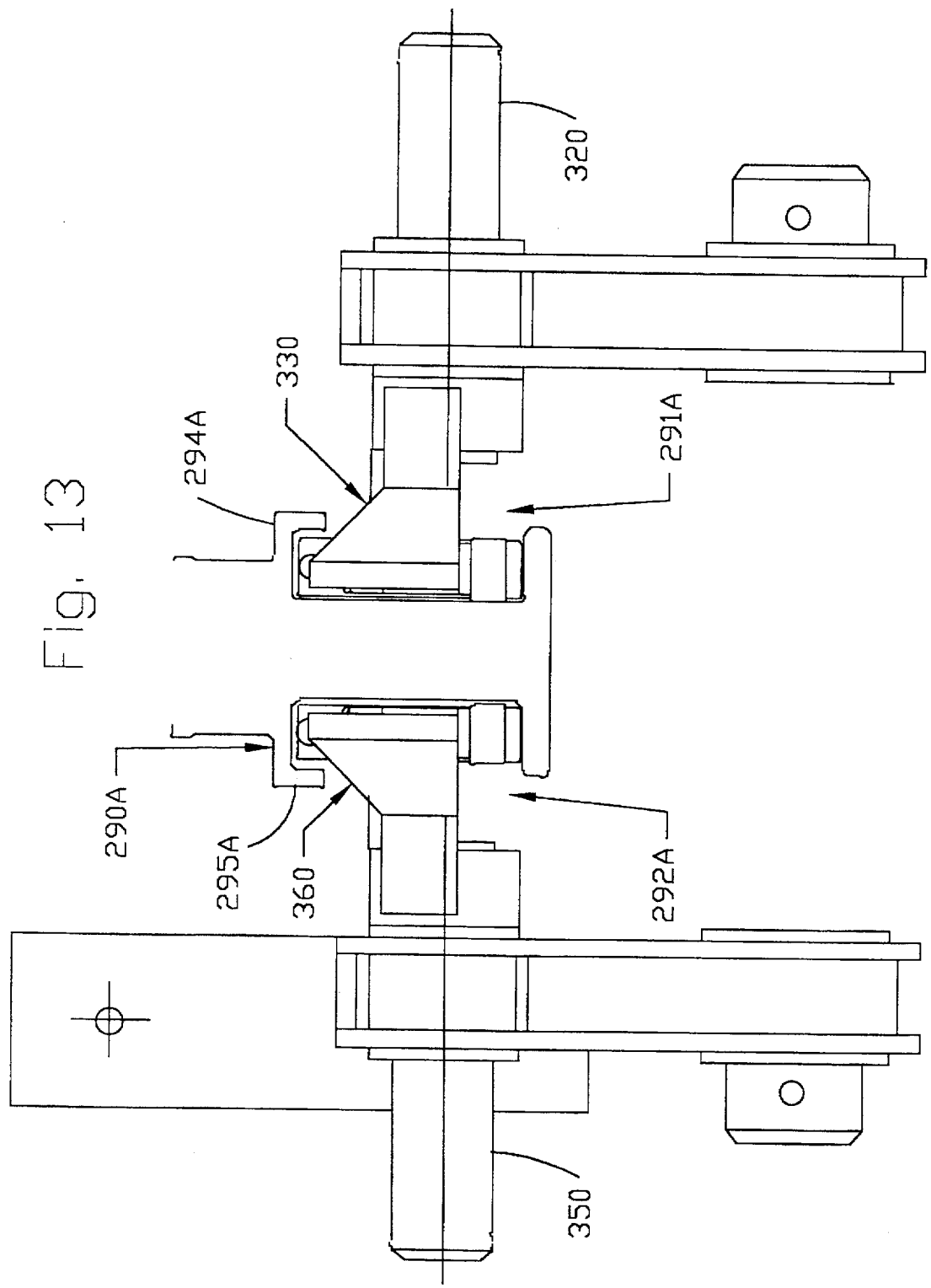

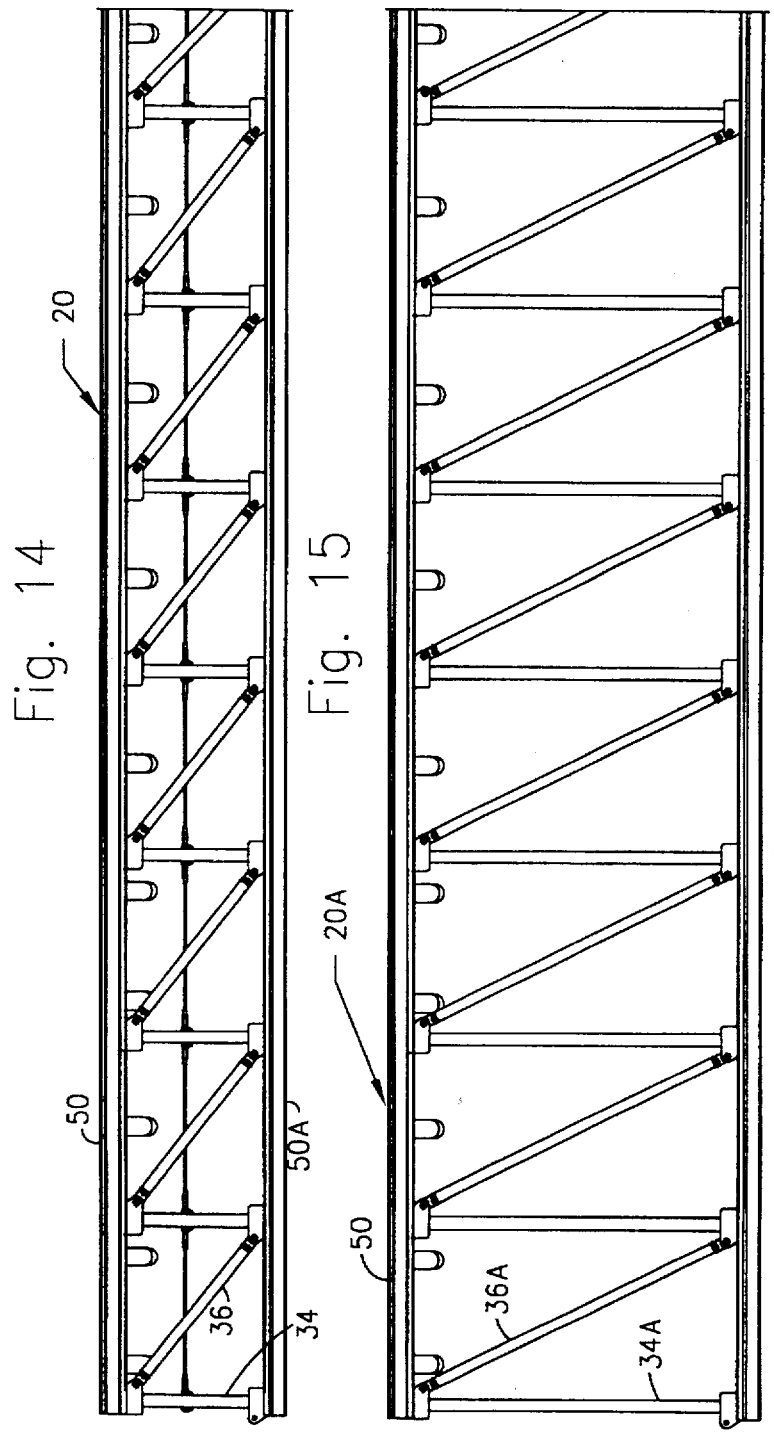

CONVEYOR MODULAR CONSTRUCTION TECHNIQUES

BACKGROUND OF THE INVENTION

1. Field of the Invention

This invention relates to concrete, or the like conveyor systems, and more particularly relates to techniques for enabling modular construction of such conveyor systems.

2. Description of the Related Art

Concrete conveying systems have frequently been used in the construction of dams for many years. A newer construction method for building concrete dams is with RCC (roller-compacted concrete) placement by lifts horizontally (layers approximately 12" in depth) from abutment to abutment instead of large monoliths (vertical block construction). Conveyor systems have proven to be successful and economical in placing this material. Such type of conveyor system is described in U.S. Pat. No. 4,846,580 (Oury, issued Jul. 11, 1989) (the "'580 Patent"). While the conveyors described in the '580 Patent have performed with limited capabilities, many improvements have been made to the conveyors in order to meet industry demands. More rapid construction techniques and substantially larger projects have necessitated an increase in conveyor capacity and reduction in assembly, shipping and handling to reduce construction costs. The present invention improves on the conveyor construction to handle increased capacities and spans between supports while providing a modular type of design to meet the diversity of construction projects and site conditions.

SUMMARY OF THE INVENTION

According to one embodiment, the invention may comprise modular apparatus for facilitating the assembly and disassembly of a concrete conveyor system comprising a first conveyor including a plurality of first roller assemblies mounted on first shafts. In such an environment, the invention preferably includes a plurality of strut members for use in a truss for supporting the first conveyor. The truss defines a top, a bottom, a first side and a second side. A first top chord for the first side of the truss defines a first cavity for guiding first support means for enabling movement of the truss with respect to a first structure, such as another conveyor. The first top chord also comprises a first clevis for attaching the first top chord to the top of the truss on the first side. A second top chord, preferably shaped like the first top chord, is attached to the top of the truss on the second side. The second top chord defines a second cavity that may cooperate with the first cavity to guide the first structure. A first bottom chord for the first side of the truss defines a third cavity for guiding third support means for enabling movement of the truss with respect to a second structure different from the first conveyor and comprising a third clevis for attaching the first bottom chord to the bottom of the truss on the first side. A second bottom chord, preferably shaped like the first bottom chord, is attached to the bottom of the truss on the second side. The second bottom chord defines a fourth cavity that may cooperate with the third cavity to guide the second structure.

By using the foregoing techniques, strut members of different sizes can be assembled to the chords to provide a truss that can be moveably supported at the top or bottom with respect to one or more additional structures, such as conveyors, to form a concrete conveyor system.

According to another embodiment of the invention, a chord member facilitates the assembly and disassembly of a concrete conveyor system comprising a first conveyor including a plurality of first roller assemblies mounted on first shafts. A top flange of the chord defines a first end and a second end and also defines a first plane. A depending first lip is positioned at the first end and a depending second lip is positioned at the second end. A bottom flange defines a second plane parallel to the first plane, and a middle flange defines a third plane perpendicular to the first plane. A clevis coupled to the top flange or the bottom flange enables the first conveyor to be attached to the clevis.

By using the foregoing techniques, conveyors of various sizes using strut members of various lengths easily can be disassembled and assembled while providing a convenient means for moving the conveyor with respect to other structures, such as additional conveyors, used in the conveyor system. By using these techniques, conveyors may be assembled and disassembled with a degree of economy and efficiency previously unattainable.

DESCRIPTION OF THE DRAWINGS

These and other advantages and features of the invention may be understood for purposes of illustration, but not of limitation, in connection with the accompanying drawings wherein like numbers refer to like parts throughout and in which:

FIG. 1 is a fragmentary top plan view of a preferred form of tripper line conveyor made in accordance with the present invention;

FIG. 2 is a side elevational view of the conveyor shown in FIG. 1;

FIG. 3 is an end view of the conveyor shown in FIG. 2 taken along line A—A of FIG. 2;

FIG. 4 is an enlarged view of the apparatus shown in FIG. 3;

FIG. 5 is an end view of a preferred form of top chord made in accordance with the preferred embodiment;

FIG. 6 is an end view of a preferred form of bottom chord made in accordance with the preferred embodiment;

FIG. 13 is an enlarged fragmentary view of a wheel assembly and supporting structure shown in FIG. 12;

FIG. 14 is a side elevational view of the same conveyor shown in FIG. 2;

FIG. 15 is a side elevational view of a modified conveyor using the chords shown in FIG. 14 assembled with longer truss struts than those shown in the FIG. 14 embodiment, and with the tie rod assemblies removed for clarity;

DESCRIPTION OF THE PREFERRED EMBODIMENTS

Figure 7:
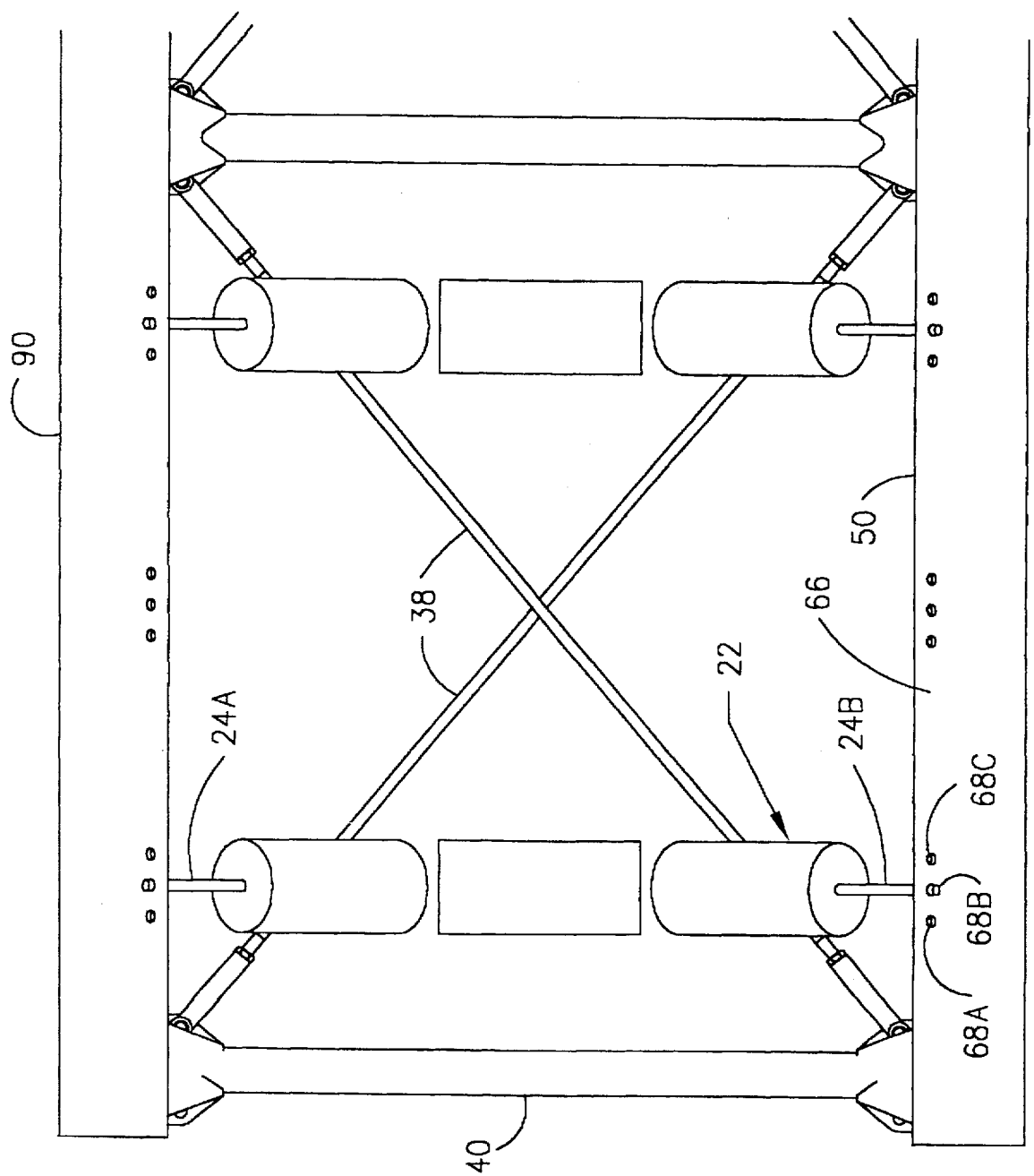
FIG. 7 is a fragmentary enlarged top plan view of a portion of the conveyor shown in FIG. 1.

Referring to FIGS. 1–4, a preferred form of modular concrete tripper line conveyor 20 comprises a plurality of U-roller assemblies, such as assembly 22, that are rotatably mounted on shafts, such as shafts 24A and 24B. Conveyor 20 also includes a plurality of V-roller assemblies, such as assembly 30, that are rotatably mounted on shafts similar to shafts 24A and 24B.

Conveyor 20 includes a truss 32 comprising a plurality of vertical struts, such as struts 34, and a plurality of diagonal struts, such as struts 36. Truss 32 also includes a plurality of tie rod assemblies, such as assemblies 38, and a plurality of cross braces, such as cross braces 40. Truss 32 defines sides 42 and 43, as well as a top T and bottom B.

Referring to FIGS. 4–6, truss 32 further comprises a top chord 50, including a top flange 52 that defines a plane P1. Depending lips 54 and 55 are integrally formed with flange 52 and are arranged perpendicular to plane P1. Chord 50 also includes a bottom flange 58 that defines a plane P2 parallel to plane P1 and a middle flange 60 that comprises sections 62 and 63 that define a plane P3 perpendicular to planes P1 and P2, as well as an internal cavity 65. A slanted flange 66 defining a plane P4 making an oblique angle with respect to plane P1 is integrally formed with flange 52 at the right-hand end of flange 52.

Referring to FIG. 7, flange 66 defines a plurality of holes arranged in groups of three, such as holes 68A–68C. Alternatively, the holes may be equally spaced along flange 66. The holes are adapted to position the shafts of the U-roller assemblies, such as shaft 24B. As shown in FIG. 7, shaft 24B is placed through hole 68B, but could be placed in hole 68A or 68C. The ability of flange 66 to define a plurality of holes is an important feature which enables a belt (not shown) carried by U-roller assembly 22 to be trained. Experience has shown that in some instances, the center of the belt drifts to one side of the center of U-roller assembly 22, thereby displacing concrete to one side of the conveyor and risking spillage. It has been discovered that by repositioning the shafts, such as shafts 24A and 24B, of the U-roller assemblies, in the holes, such as holes 68A–68C, the conveyor belt can be retrained so that the concrete more closely follows the midline of conveyor 20.

Referring to FIG. 5, top chord 50 defines cavities 70 and 71 that enable support structures, such as sliding pads or wheel assemblies, to move with respect to conveyor 20. As will be explained in more detail later, the sliding pads or wheel assemblies may be connected to various structures, including conveyors other than conveyor 20. Lips 54 and 55 are an important feature that keep such pads or wheel assemblies within cavity 70 or 71.

Chord 50 also includes a clevis 74 that comprises vertical flanges 76 and 77. Referring to FIG. 4, clevis 74 is fastened to a vertical strut 34 of conveyor 20 by means of a conventional bolt assembly 78.

Referring to FIGS. 4 and 6, truss 32 further includes a bottom chord 50A in which parts like those of chord 50 are indicated by like numerals followed by the letter A in FIG. 6. Chord 50A also includes a top clevis 84 that comprises vertical flanges 86 and 87 arranged as shown in FIG. 6. Referring to FIG. 4, clevis 84 is fastened to vertical strut 34 of conveyor 20 by a conventional bolt assembly 88.

Referring to FIG. 4, truss 32 also includes a top chord 90 which is identical to top chord 50, and a bottom chord 90A which is identical to bottom chord 50A.

Referring to FIGS. 4–6, all of the components of chords 50, 50A, 90 and 90A are integrally formed by extruding aluminum. This is an important feature which reduces the weight of the chord and aids assembly. In addition, aluminum is corrosion and rust resistant and is suitable for outdoor use. As shown in FIGS. 1 and 2, each of chords 50, 50A, 90 and 90A, and all components of those chords, extend continuously along conveyor 20. This is an important feature which enables a pad assembly or wheel assembly carried by the chords to move continuously throughout the length of conveyor 20.

Figure 8:
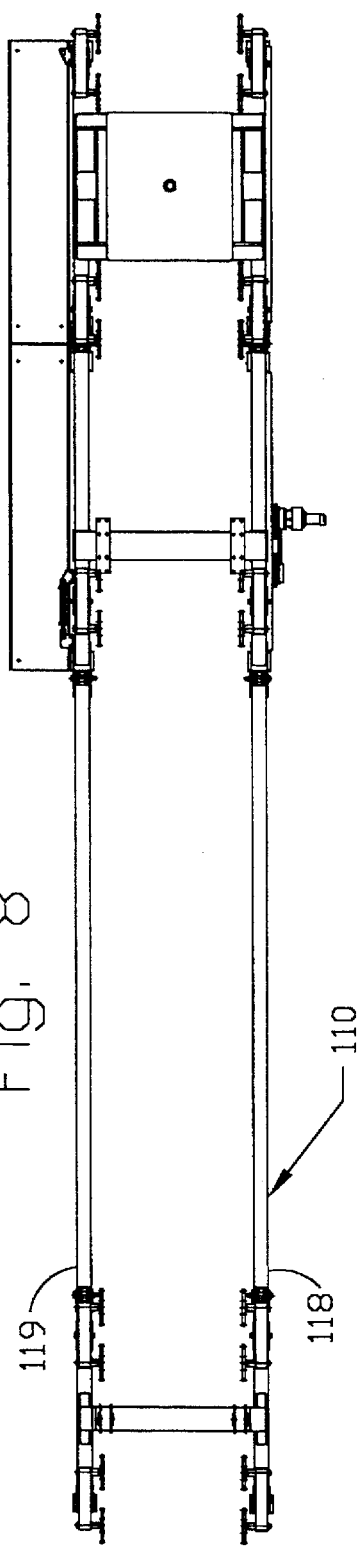
FIG. 8 is a top plan view of a preferred form of tripper conveyor assembly made in accordance with the preferred embodiment.
Figure 9:
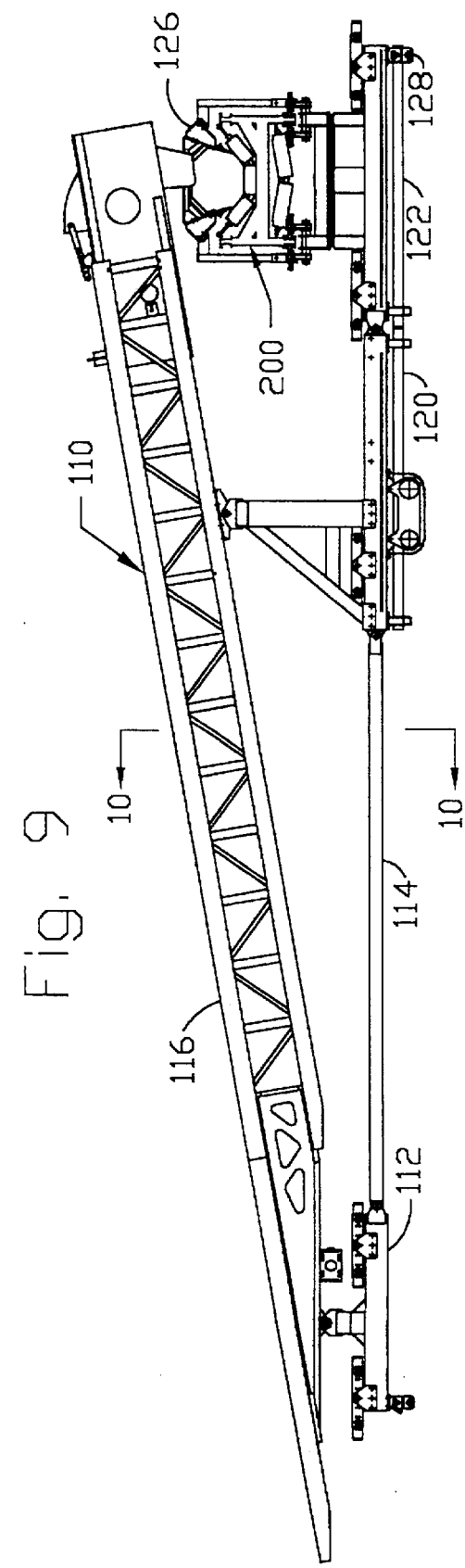
FIG. 9 is a side elevational view of the tripper conveyor assembly shown in FIG. 8 assembled with a link conveyor.

FIGS. 8 and 9 illustrate a preferred form of tripper conveyor assembly 110 made in accordance with the preferred embodiment. Assembly 110 includes a tail support assembly 112, a stiff leg 114, a truss 116 that includes top chords 118 and 119, a conveyor support assembly 120, a lower tripper frame assembly 122, a transfer skirt assembly 126 and a guide roller assembly 128.

Figure 10:
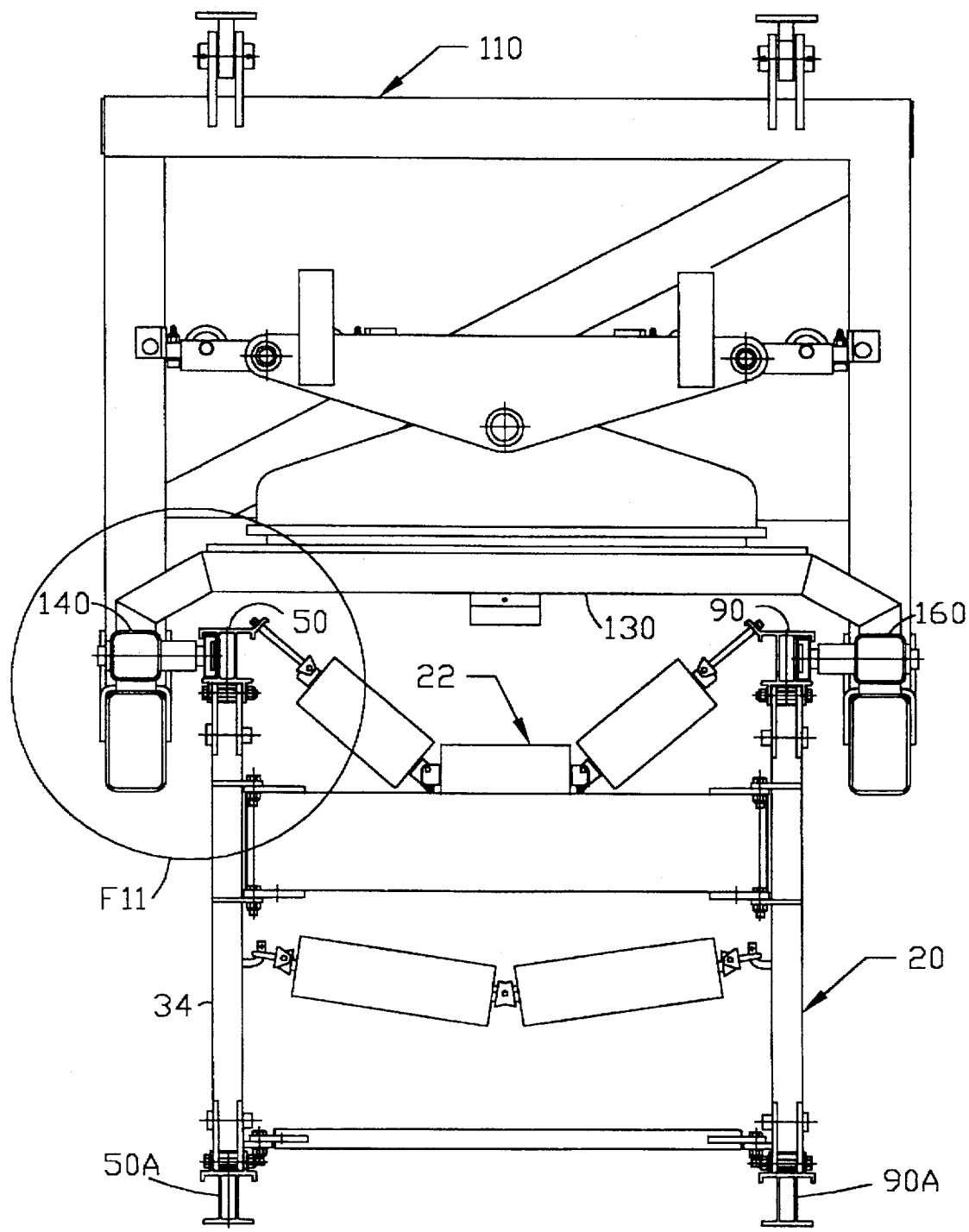
FIG. 10 is a cross-sectional view of the tripper conveyor assembly shown in FIG. 9 taken along line 10—10 and assembled on top of the tripper line conveyor shown in FIG. 4.
Figure 11:
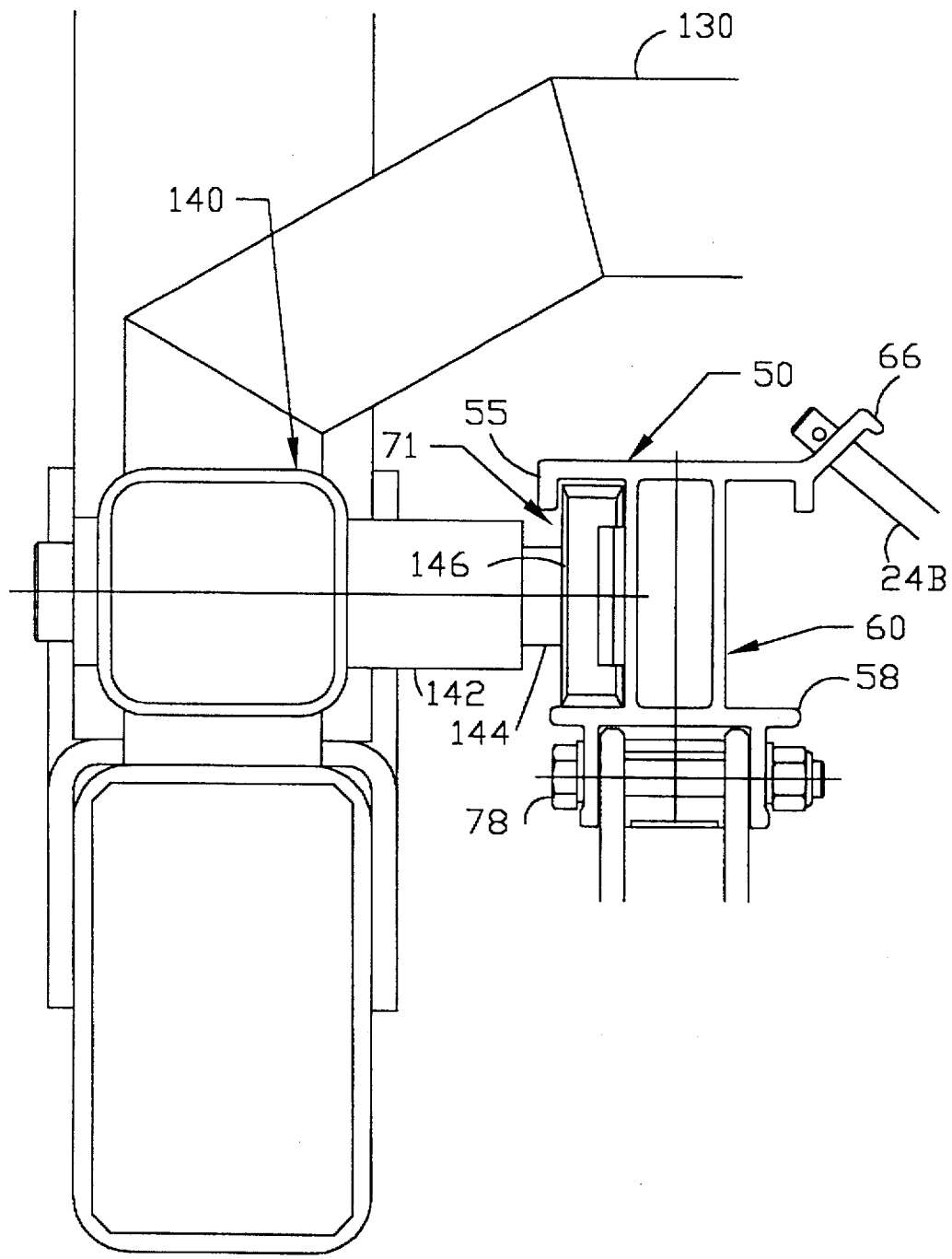
FIG. 11 is a view of portion F11 identified in FIG. 10.

Referring to FIG. 10, tripper conveyor assembly 110 also includes a cross beam 130 that supports identical pad assemblies 140 and 160. Referring to FIG. 11, pad assembly 140 includes a bushing or hub 142 and a cylindrical rod 144 that supports a slidable pad 146. As shown in FIG. 11, pad 146 is mounted in cavity 71 of top chord 50. Pad assembly 140 preferably comprises material such as plastic or nylatron, which is capable of sliding along top chord 50 with relatively little friction. Lip 55 confines pad 146 in cavity 71.

Figure 12:
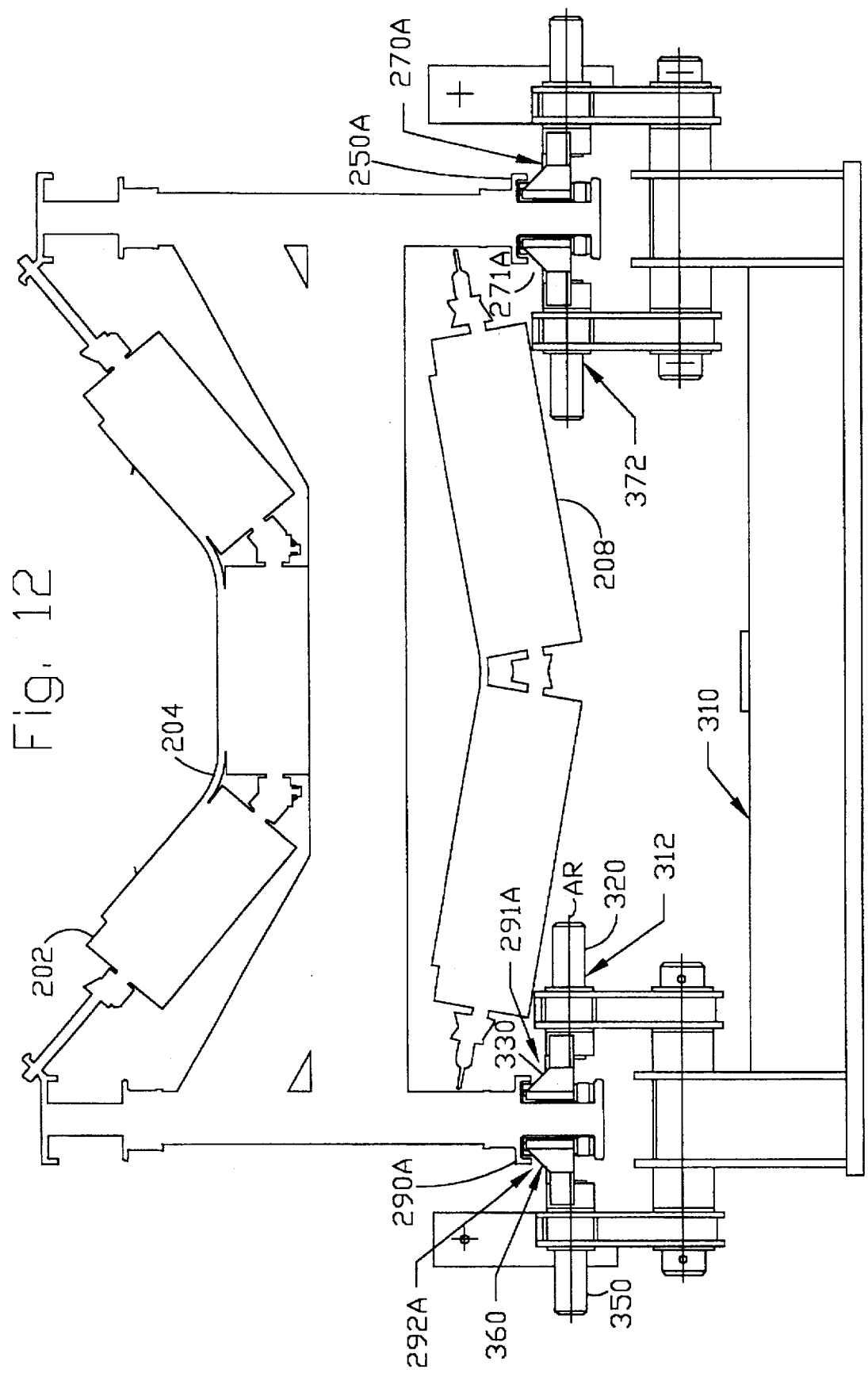
FIG. 12 is an enlarged fragmentary view of the link conveyor assembly shown in FIG. 9.

Referring to FIG. 9, transfer skirt assembly 126 is used to transfer wet concrete from conveyor assembly 110 to a link conveyor assembly 200 made in accordance with the preferred embodiment. As shown in FIG. 12, link conveyor assembly 200 includes a U-roller assembly 202 that supports a concrete conveyor belt 204. Assembly 200 also includes a V-roller assembly 208 arranged as shown. The bottom portion of link conveyor 200 is fitted with a bottom chord 250A that is identical to chord 50A and which defines cavities 270A and 271A identical to cavities 70A and 71A (FIG. 6). The opposite side of link conveyor assembly 200 is fitted with another bottom chord 290A identical to bottom chord 90A. Chord 290A defines cavities 291A and 292A identical to cavities 70A and 71A, respectively (FIG. 13).

Link conveyor assembly 200 is moveable with respect to a turntable assembly 310 (FIG. 12) which is supported on tripper line conveyor 20 in the manner shown in FIG. 9. As shown in FIG. 12, turntable assembly 310 includes a roller assembly 312 comprising axles 320 and 350 aligned on a common axis of rotation AR. A wheel assembly 330 is rotatably mounted on axle 320 and an identical wheel assembly 360 is rotatably mounted on axle 350. As shown in FIG. 13, wheel assembly 330 is rotatably assembled inside cavity 291A and wheel assembly 360 is rotatably mounted inside cavity 292A. This is an important feature of the invention which enables link conveyor assembly 200 to be quickly assembled and disassembled with respect to tripper line conveyor 20. As shown in FIG. 13, chord 290A includes depending lips 294A and 295A corresponding to lips 54A and 55A, respectively (FIG. 6). Lips 294A and 295A guide wheel assemblies 330 and 360 within chord 290A and enable the link conveyor assembly 200 to be smoothly moved with respect to structure 310. As shown in FIG. 12, structure 310 also includes another roller assembly 372 identical to roller assembly 312 that operates inside the cavities defined by bottom chord 250A. Wheel assembly 330 may be implemented by model number PB-32316 sold by Rotec Industries which is incorporated by reference. Wheel assembly 330 includes a pair of wheels joined by a frame (not shown). The frame spaces the wheels by a set distance.

Only one of the wheels in the pair is shown in FIG. 12. Both wheels in the pair roll within cavity 291A.

FIG. 14 illustrates the same tripper line conveyor 20 shown in FIG. 2. If the need arises for a conveyor with more capacity requiring an increased distance between top chord 50 and bottom chord 50A, conveyor 20 easily can be disassembled and then reassembled using vertical struts 34A and diagonal struts 36A (FIG. 15) that are longer than corresponding struts 34 and 36 shown in FIG. 14. This is an important feature of the invention which enables a pair of top chords and bottom chords to be used interchangeably with vertical and diagonal struts of various lengths to form conveyors of varying capacities.

Figure 16:
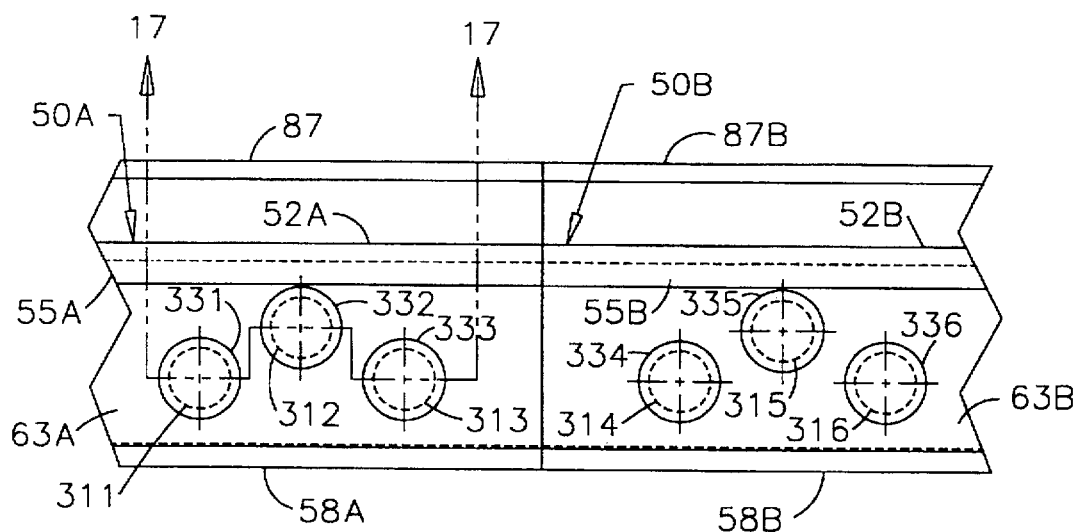
FIG. 16 is an enlarged, fragmentary side elevational view of a preferred form of structure for joining two bottom chords of the type shown in FIG. 6.
Figure 17:
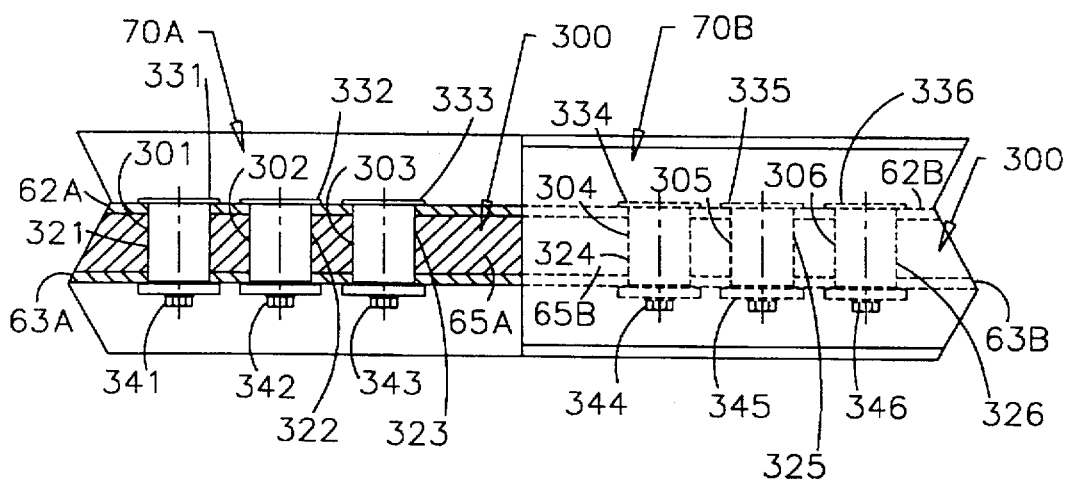
FIG. 17 is a view taken along line 17—17 of FIG. 16.

Referring to FIG. 16, bottom chord 50A is shown in abutting relationship to an identical bottom chord 50B. The parts of chord 50B corresponding to the like-numbered parts of chord 50A are identified with the letter B in FIGS. 16 and 17. In order to join chord 50A with chord 50B, a bar 300 is slid into cavities 65A and 65B of bottom chords 50A and 50B, respectively. Bar 300 is drilled with holes 301–306 (FIG. 17). Sections 62A and 63A are drilled with holes 311–313 (FIG. 16) corresponding to holes 301–303, and sections 62B and 63B are drilled with holes 314–316 corresponding to holes 304–306. Holes 301–303 and 311–313 are fitted with pins 321–323 (FIG. 17), and holes 304–306 and 314–316 are fitted with pins 324–326. Pins 321–326 terminate in lips 331–336, respectively. Pins 321–326 are held in the holes with conventional bolt and washer assemblies 341–346, respectively. An identical arrangement of bars and pins is used to join top chords 50 and 90 and bottom chord 90A with additional chords to form a longer conveyor.

Pad 146 can be fit into cavities 70A and 70B so that the pad glides over lips 331–336 and moves smoothly from chord 50A to chord 50B and vice versa. Likewise, wheel assembly 330 can be fit into cavities 70A and 70B so that the assembly glides over lips 331–336 and moves smoothly from chord 50A to chord 50B and vice versa. By providing a continuous cavity from one chord to another, one conveyor, such as tripper conveyor 110, can travel the length of a supporting conveyor, such as tripper line conveyor 20. This is an important feature in the placement of roller compacted concrete. In addition, hinges can be inserted into the cavities of the chords to allow angular changes between truss sections; this is sometimes required to follow the profile of excavations or landscape.

By using the top and bottom chords described in this specification, conveyors can be assembled and disassembled with a degree of ease and economy previously unattainable. In addition, the chords inherently provide cavities enabling a conveyor to be moved with respect to another structure, such as another conveyor of the conveyor system.

Those skilled in the art will recognize that the embodiments may be altered and modified without departing from the true spirit and scope of the invention as defined in the accompanying claims.

We claim:

1. Modular concrete conveyor apparatus for facilitating the assembly and disassembly of a concrete conveyor system comprising a first conveyor including a plurality of first roller assemblies mounted on first shafts, said apparatus comprising in combination:

a plurality of strut members for use in a truss for supporting said first conveyor, said truss defining a top, a bottom, a first side and a second side;

a first top chord for said first side of said truss, said first top chord defining a first cavity for guiding first support means for enabling movement of said truss with respect to a first structure different from said first conveyor and comprising a first clevis for attaching said first top chord to the top of said truss on said first side;

a second top chord for said second side of said truss, said second top chord defining a second cavity for guiding second support means for enabling movement of said truss with respect to said first structure and comprising a second clevis for attaching said second top chord to said top of said truss on said second side;

a first bottom chord for said first side of said truss, said first bottom chord defining a third cavity for guiding third support means for enabling movement of said truss with respect to a second structure different from said first conveyor and comprising a third clevis for attaching said first bottom chord to said bottom of said truss on said first side;

a second bottom chord for said second side of said truss, said second bottom chord defining a fourth cavity for guiding fourth support means for enabling movement of said truss with respect to said second structure and comprising a fourth clevis for attaching said second bottom chord to said bottom of said truss on said second side, whereby strut members of different sizes can be assembled to said chords to provide a truss that can be movably supported at said top or bottom with respect to another structure to form a concrete conveyor system.

2. Apparatus, as claimed in claim 1, wherein said first clevis extends continuously along said first top chord, wherein said second clevis extends continuously along said second top chord, wherein said third clevis extends continuously along said first bottom chord and wherein said fourth clevis extends continuously along said second bottom chord.

3. Apparatus, as claimed in claim 1, wherein said first support means comprises a first pad and said second support means comprises a second pad, said first and second pads being arranged in sliding relationship with said first and second cavities.

4. Apparatus, as claimed in claim 1, wherein said third support means comprises a first wheel assembly and wherein said fourth support means comprises a second wheel assembly, said first and second wheel assemblies being arranged in rotating relationship with respect to said third and fourth cavities.

5. Apparatus, as claimed in claim 1, wherein said first conveyor comprises a concrete tripper line conveyor and wherein said second structure comprises a concrete link conveyor.

6. Apparatus, as claimed in claim 1, wherein said first top chord further comprises a first flange for defining a plurality of first holes and said second top chord further comprises a second flange for defining a plurality of second holes, said first and second holes positioning said first shafts of said first roller assemblies so that said concrete is urged toward the midline of said first conveyor.

7. Apparatus, as claimed in claim 6, wherein said first flange extends continuously along said first top chord and wherein said second flange extends continuously along said second top chord.

8. Apparatus, as claimed in claim 1, wherein said first conveyor comprises a concrete tripper line conveyor and wherein said first structure comprises a second conveyor of said conveyor system different from said first conveyor.

9. Apparatus, as claimed in claim 8, wherein said second conveyor comprises a concrete tripper conveyor.

10. Apparatus, as claimed in claim 1, wherein said first and second top chords have an identical cross section, whereby said first and second top chords are interchangeable between said first and second sides of said truss.

11. Apparatus, as claimed in claim 10, wherein said first and second bottom chords have an identical cross section, whereby said first and second bottom chords are interchangeable between said first and second sides of said truss.

12. Apparatus, as claimed in claim 1, wherein said first, second, third and fourth cavities each are defined by:

a straight first flange positioned at a first end of said cavity;

at least one lip depending from said first flange;

a straight second flange positioned at a second end of said cavity opposite said first end; and a straight third flange arranged generally perpendicular to said first flange and positioned between said first flange and said second flange.

13. Apparatus, as claimed in claim 12, wherein said lip and said first, second and third flanges are integrally formed.

14. Apparatus, as claimed in claim 13, wherein said lip and said first, second and third flanges are fabricated from aluminum.

15. A chord member for facilitating the assembly and disassembly of a concrete conveyor system comprising a first conveyor including a plurality of first roller assemblies mounted on first shafts, said member comprising in combination:

an top flange defining a first end and a second end and defining a first plane;

a depending first lip positioned at said first end;

a depending second lip positioned at said second end;

a bottom flange defining a second plane parallel to said first plane;

a middle flange defining a third plane perpendicular to said first plane; and a clevis coupled to said top flange or said bottom flange, whereby said first conveyor can be attached to said clevis.

16. Apparatus, as claimed in claim 15, wherein said top flange, first lip, second lip, bottom flange, middle flange and clevis extend continuously along said first conveyor.

17. Apparatus, as claimed in claim 15, wherein said middle flange defines an internal cavity and a first set of holes, and further comprising:

a bar located in said internal cavity, said bar defining a second set of holes adapted to comate with said first set of holes; and pin means extending through said first and second sets of holes whereby said bar is joined with said chord member so that said chord member can be removably joined with another chord member.

18. Apparatus, as claimed in claim 15, wherein said top flange, at least one of said first and second lips, said bottom flange and said middle flange define a cavity for guiding first support means for enabling movement of said first conveyor with respect to a structure different from said first conveyor.

19. Apparatus, as claimed in claim 18, wherein said structure comprises a second conveyor.

20. Apparatus, as claimed in claim 15, wherein said top flange, first lip, second lip, bottom flange, middle flange and clevis are integrally formed.

21. Apparatus, as claimed in claim 20, wherein said top flange, first lip, second lip, bottom flange, middle flange and clevis are fabricated from aluminum.

22. Apparatus, as claimed in claim 15, wherein said top flange, said first and second lips, said bottom flange and said middle flange define first and second cavities positioned on opposite sides of said middle flange for guiding first support means for enabling movement of said first conveyor with respect to a structure different from said first conveyor.

23. Apparatus, as claimed in claim 22, wherein said structure comprises a second conveyor.

24. Apparatus, as claimed in claim 15, and further comprising a slanted flange defining a fourth plane making an oblique angle with respect to said first plane and defining a plurality of first holes for positioning said first shafts of said first roller assemblies so that said concrete is urged toward the midline of said first conveyor.

25. Apparatus, as claimed in claim 24, wherein said slanted flange extends continuously along said first conveyor.

\* \* \* \* \*